United States Patent [19]

Bender

[11] Patent Number: 4,967,989
[45] Date of Patent: Nov. 6, 1990

[54] SEAT BRACKETS FOR PICK-UP TRUCKS AND THE LIKE

[75] Inventor: Daniel Bender, Box 57, Loreburn, Saskatachewan, Canada, S0H 2S0

[73] Assignees: Daniel Bender; Rosalie C. Bender, both of Loreburn, Canada

[21] Appl. No.: 431,157

[22] Filed: Nov. 3, 1989

[51] Int. Cl.⁵ .......................................... F16M 11/00
[52] U.S. Cl. ................................ 248/188.1; 248/201; 248/300; 297/445
[58] Field of Search .................. 248/188.1, 678, 676, 248/300, 201, 675; 297/130, 445; 206/335

[56] References Cited

U.S. PATENT DOCUMENTS

| | | | |
|---|---|---|---|
| 1,161,051 | 11/1915 | Hill | 248/188.1 |
| 1,380,123 | 5/1921 | Sullivan | 248/678 X |
| 2,641,311 | 6/1953 | Ingram, Jr. et al. | 297/445 X |
| 3,476,342 | 11/1969 | Motl et al. | 248/188.1 X |
| 3,599,911 | 8/1971 | Monte | 248/300 X |
| 3,789,042 | 4/1957 | Kinney | 248/300 |
| 4,690,359 | 9/1987 | Phillips | 248/300 |

Primary Examiner—Alvin C. Chin-Shue
Attorney, Agent, or Firm—Murray E. Thrift; Stanley G. Ade; Adrian D. Battison

[57] ABSTRACT

A seat lift kit is used for raising the bench seat in the back of an extended cab pick-up truck. The kit includes a pair of channel shaped bench brackets that bolt directly to the existing seat bench and bench mounting holes on the cab floor and a similar pair of channel shaped seat back brackets. The back brackets carry an angle section that supports the rear edge of the seat bench. The seat back is retained in an upright position with a hook and loop pile fastener with one component secured to the truck cab and the other to the seat back. The seat belts are extended using angled extension bars. In preferred embodiments, the seat bench and the bottom of the seat back are moved forwards so that the seat back slopes upwardly and to the rear, making the seat more comfortable for the occupant.

12 Claims, 2 Drawing Sheets

SEAT BRACKETS FOR PICK-UP TRUCKS AND THE LIKE

FIELD OF THE INVENTION

The present invention relates to a seat lift kit for floor mounted bench seats in the back of extended cab pick-up trucks.

BACKGROUND

An extended cab pick up truck may be equipped with a bench seat behind the front seat or seats. In some trucks, such as the Ford F-Series Super Cab TM, the seat bench is mounted on the floor and the seat back is mounted on the back wall of the cab. Such seats are uncomfortable, primarily because of the low height of the bench. The vertical orientation of the back may also cause comfort problems.

It has been proposed to provide a lift kit for a seat back of this type. The kit is, however, extremely complex and difficult to install. It requires the drilling of several holes in the vehicle body.

SUMMARY

The present invention is concerned with the provision of a simple, easy to install seat lift kit.

According to the present invention there is provided a seat lift kit for a seat having a bench and a back mounted on the floor in an extended cab pick-up truck, said kit comprising;

two bench support brackets, each having a bottom flange with two bottom holes alignable with seat bench mounting holes in the truck floor, a top flange with two top holes alignable with mounting holes in the seat bench, and a web of predetermined width joining the top and bottom flanges;

two back support brackets, each having a bottom flange with two bottom holes alignable with seat back mounting holes in the truck floor, a top flange with two top holes alignable with mounting holes in the seat back, a web of said predetermined width joining the top and bottom flanges, and front plates closing front ends of the second channel sections; and a rear bench support with a flange securable to the front plates of the back support brackets, and a second flange projecting at right angles therefrom.

The bench support brackets are used to raise the seat bench to the desired height. They bolt directly to the floor, using the bench mounting bolts, and directly to the bench, using bolts through the existing bench mounting holes. The back support brackets similarly raise the seat back using existing mounting fittings. The rear bench support extends between the back support brackets to support the rear edge of the bench, where it is supported by the cab floor in the original installation.

In preferred embodiments of the invention, the top holes in the support brackets sections are offset to the front from the bottom holes, so that the seat back has a slope upwardly to the rear, making the seat more comfortable in the sitting position.

The kit preferably also includes hook and loop pile fastener material for holding the seat back against the back of the cab, as such seats are conventionally hinged so that they can flip down on top of the bench. The kit may also include extension bars for the seat belts, which mount at one end to the mount for the seat belt anchor on the floor of the truck and at the other end to the seat belt anchor itself.

BRIEF DESCRIPTION OF THE DRAWINGS

In the accompanying drawings, which illustrates an exemplary embodiment of the present invention.

DETAILED DESCRIPTION

Figure 1:
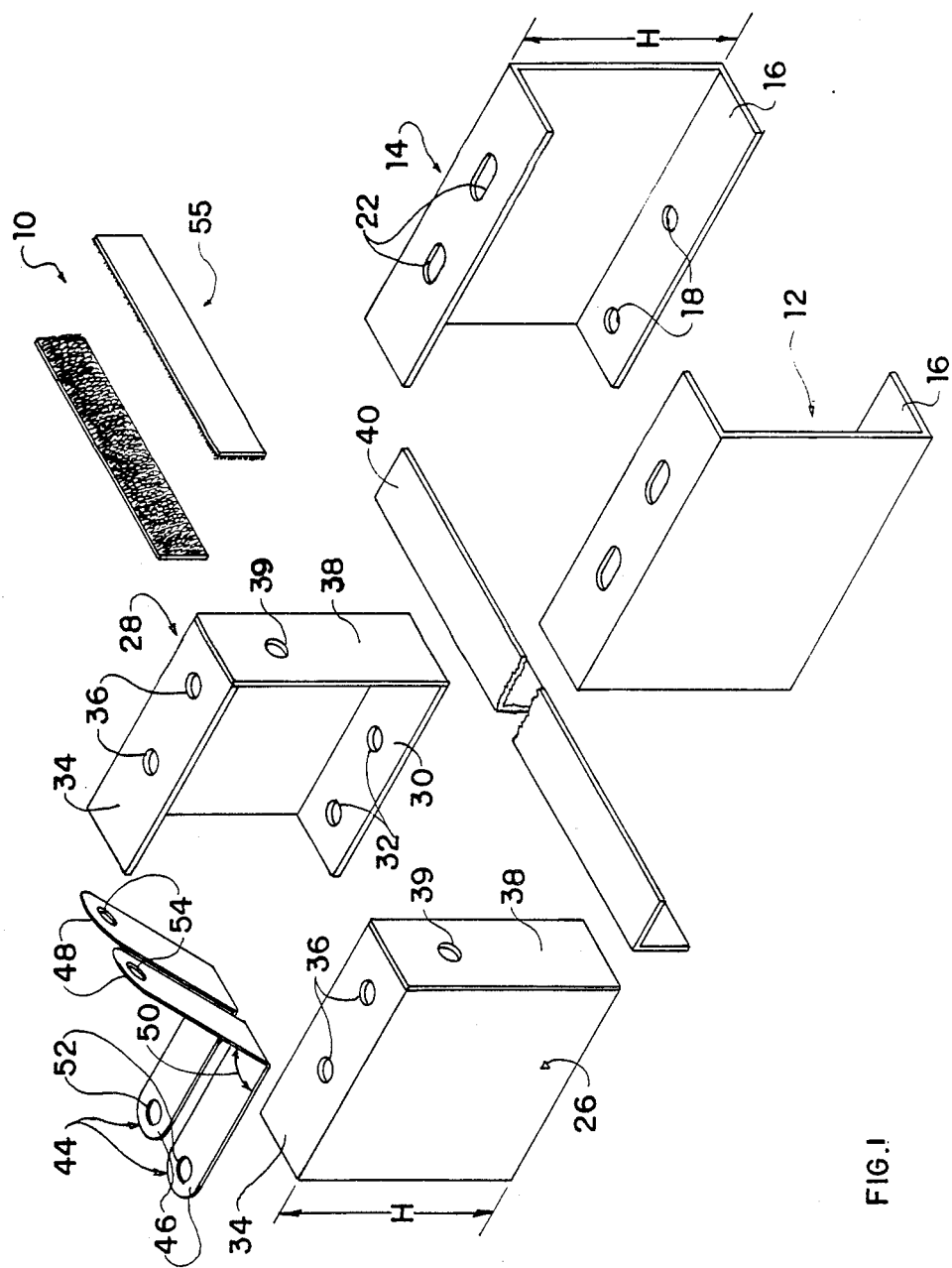
FIG. 1 is an isometric representation of a kit showing the various parts thereof.

Referring to the accompanying drawings, and especially to FIG. 1 there is illustrated a lifting kit 10 for raising the seat in an extended cab pick-up truck.

The kit includes a left bench bracket 12 and a right bench bracket 14. Each is a channel section six inches long, with a web width, or bracket height H of four and one-half inches. The bottom flange 16 of each bracket has two bottom holes 18 that are arranged to align with the bench mounting holes in the floor of the truck. The top flange 20 has two top holes 22 that are arranged to align with the mounting holes on the seat bench. The top holes 22 are elongated and offset towards the front of the channel section from the bottom holes 18.

The kit further includes two seat back brackets, a left bracket 26 and a right bracket 28. Each of the brackets includes a channel section four and one-half inches long, with a web width H of four and one-half inches. The bottom flange 30 of each channel section has two holes 32 that align with the mounting holes in the truck for the seat back. A top flange 34 has two holes 36 that align with the mounting holes of the seat back. The top holes 36 are offset to the front from the bottom holes 32. At the front end of each bracket is a flat plate 38 joining the flanges and the web of the channel. Each plate has a bolt hole 39 that is used to bolt a rear bench support angle 40 across the front of the two seat back brackets 16 and 18.

There are two seat belt extension bars 44. Each of these has a floor section 46 and a belt section 48 that meet at an obtuse angle 50. The floor section has a mounting hole 52 for mounting the extension bar to the seat belt mount in the floor of the truck. The belt section 48 has an anchoring hole 54 for receiving a mounting bolt securing the seat belt anchor to the extension bar.

The kit is completed with a strip of two component hook and loop pile fastener material of the type sold under the trademark VELCRO, with an adhesive backing.

Figure 2:
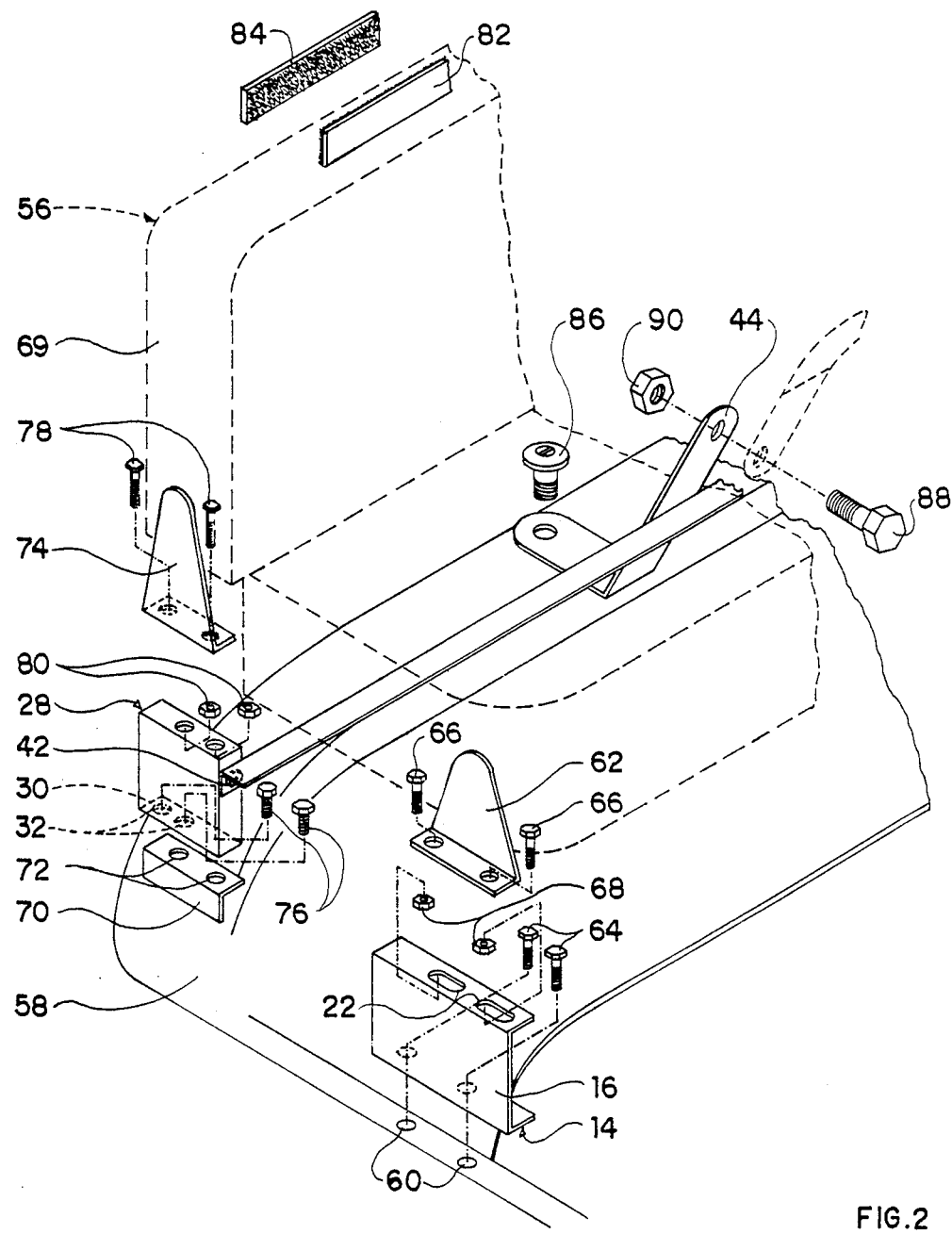
FIG. 2 is an isometric representation showing the installation of the kit on one side of a truck seat.

The installation of the kit is illustrated most particularly in FIG. 2. This illustrates the right hand side of a seat 56 that is conventionally mounted on the floor 58 of an extended cab pick-up truck. The seat is conventionally mounted in place with bolts 64 extending through bench mounting brackets 62 into bench mounting holes 60 in the floor of the truck. In this case, the bench bracket 14 is secured to the mounting holes 60 through the use of bolt 64, while the bench mounting bracket 62 is secured to the top flange of the bracket 16 with bolts 66, nuts 68 and appropriate washers. The elongated holes 22 provide for adjustment of the bench position.

The seat back 69 is conventionally mounted on the floor of the cab with bolts 76 extending through brackets 74 on each side of the seat back and into mounting holes 72 in floor brackets 70. With the kit installed, the bolts 76 extend through the holes 32 in the bottom flange 30 of the seat back bracket 28 to secure the bracket to the floor of the cab. The seat back brackets 74 are secured to the top flanges of the seat back brackets by bolts 78, nuts 80 and associated washers, thus raising the back. Because the holes in the top flanges of the bench and back brackets are offset to the front, the seat back becomes sloped up to the rear. The hook fastener component 82 of the hook and loop pile fastener is attached to the seat back near the top using the adhesive on its back face. The loop fastener component is attached to the cab of the truck to engage the hook component when the top of the seat back is pressed backwards against the back wall of the cab.

The extension bars, one of which is illustrated in FIG. 2, are secured to the floor of the cab using the seat belt anchor bolts 86. Each seat belt anchor attached directly to the belt, is fixed to the belt end of the extension bar 44 using a bolt 88 and a nut 90.

The angle 40 is, before re-installation of the seat, bolted to the front plates 38 of the seat back brackets 26 and 28 with bolts 42. The angle supports the rear edge of the seat bench.

The lift kit of the present invention is very simple, using a minimum of extra parts and using the existing mounting holes in the truck cab.

While one particular embodiment of the present invention has been described in the foregoing, it is to be understood that other embodiments are possible within the scope of the invention. The invention is to be considered limited solely by the scope of the appended claims.

I claim:

1. In an extended cab pick-up truck with a laterally extending rear seat having a bench and a back, the seat being normally mounted on the floor by aligned bench mounting holes in the bench and the floor and aligned back mounting holes in the back and the floor, and seat mounting bolts through the aligned mounting holes, a seat lift kit comprising:
    two laterally spaced bench support brackets, each having a bottom flange with two bottom holes aligned with respective ones of the seat bench mounting holes in the truck floor, a top flange with two top holes aligned with respective ones of the mounting holes in the seat bench, and a web of predetermined width joining the top and bottom flanges;
    two laterally spaced back support brackets, each having a bottom flange with two bottom holes aligned with respective ones of the seat back mounting holes in the truck floor, a top flange with two top holes aligned with respective ones of the back mounting holes in the seat back, a web of said predetermined width joining the top and bottom flanges and front plates closing front ends of the back support brackets;
    a laterally extending rear bench support with a flange secured to the front plates of the back support brackets, and a second flange projecting at right angles therefrom; and
    mounting bolts through the bottom and top holes and the respective aligned mounting holes securing the brackets to the floor and the seat to the brackets.

2. The invention according to claim 1 wherein each bench support bracket the top holes are offset towards a front end of the bracket with respect to the bottom holes.

3. The invention according to claim 2 wherein in each bench support bracket the top holes are elongated.

4. The invention according to claim 3 wherein in each back support bracket the top holes are offset towards the front end of the bracket with respect to the bottom holes.

5. The invention according to claim 1, wherein each bench support bracket is a channel section.

6. The invention according to claim 2, wherein each bench support bracket is a channel section.

7. The invention according to claim 4, wherein each bench support bracket is a channel section.

8. The invention according to claim 1, wherein each back support bracket includes a channel section consisting of the top and bottom flanges and the web thereof.

9. The invention according to claim 2, wherein each back support bracket includes a channel section consisting of the top and bottom flanges and the web thereof.

10. The invention according to claim 4, wherein each back support bracket includes a channel section consisting of the top and bottom flanges and the web thereof.

11. The invention according to claim 1 including a two component hook and loop pile fastener means, with each component having a self adhesive backing for securing the components respectively to the seat back and the truck cab.

12. The invention according to claim 1 including a plurality of extension bars, each having two elongate ends arranged at an obtuse angle with respect to one another, with one end connected to a mounting for a seat belt anchor, and the other end connected to the seat belt anchor.

* * * * *